United States Patent Office 3,636,096
Patented Jan. 18, 1972

3,636,096
PROCESS FOR THE PREPARATION OF BENZENE DICARBOXYLIC ACIDS
Marion J. Mathews III and Charles R. Campbell, Pensacola, Fla., assignors to Monsanto Company, St. Louis, Mo.
No Drawing. Filed Feb. 27, 1968, Ser. No. 708,527
Int. Cl. C07c 63/02
U.S. Cl. 260—524 N          8 Claims

ABSTRACT OF THE DISCLOSURE

In the preparation of a benzene dicarboxylic acid by oxidation of a liquid xylene with nitric acid, the yield of the benzene dicarboxylic acid can be substantially improved by carrying out the oxidation in the presence of a nitro-substituted aromatic compound.

BACKGROUND OF THE INVENTION

It is known that xylenes can be oxidized with nitric acid to prepare benzene dicarboxylic acids having a variety of uses, e.g. in the production of condensation polymers such as polyamides and polyesters. In general, the reaction has been carried out in the liquid phase, at an elevated temperature (usually substantially higher than 150° C.) and preferably in the presence of an oxidation catalyst such as vanadium. However, the yield of the oxidation reaction is normally much lower than theoretical and past attempts to improve the yield and thereby lower the proportion of the xylenes that are converted to waste by-product have been less than completely successful. Accordingly, is an object of the present invention to provide a novel process improvement whereby the reaction yield can be increased and the cost of the benzene dicarboxylic acid product thus decreased.

SUMMARY OF THE INVENTION

It has now been discovered that the yield of benzene dicarboxylic acid from the oxidation of a xylene with nitric acid can be substantially improved by carrying out the oxidation in the presence of at least one nitro-substituted aromatic compound. It has also been found that the higher yields of the process of this invention can be obtained at oxidation temperatures which are lower than those with which the reaction has been generally carried out in the past.

DETAILED DESCRIPTION OF THE INVENTION

The starting material for the process of this invention may be ortho-, meta- or para-xylene or a mixture of two or three different xylenes. Starting materials of as high a purity as practicable are preferred although the process can be carried out in the presence of various impurities that do not interfere to prevent substantial oxidation of the xylenes to benzene dicarboxylic acids.

The nitric acid used to oxidize the xylenes is also advantageously as pure as practicable. Although the desired oxidation reaction can be achieved with a broad range of nitric acid concentrations, it is generally preferable to carry out the process with nitric acid having a concentration between about 35% and about 70% by weight and even more desirably between 35% and 60% by weight. For best results, the reaction is also carried out in the presence of an excess of nitric acid over the theoretical amount needed for oxidation of the xylene to the corresponding benzene dicarboxylic acid.

Substantial oxidation can be achieved without the use of a reaction catalyst, but commercially attractive yields generally require that the process be carried out in the presence of a catalyst such as vanadium which is most conveniently added in the form of a salt that is soluble in nitric acid, e.g. ammonium, sodium or potassium vanadate, vanadyl nitrate or sulfate, etc. The process can be carried out to advantage with any amount of the dissolved vanadium that is sufficient to accelerate the desired oxidation reaction and/or to inhibit the degradation of the xylene to lower carboxylic acids. Most desirably, the aqueous nitric acid contains at least about 0.06% by weight of vanadium, and concentrations between about 0.06% and about 0.6% of vanadium by weight of the nitric acid are generally adequate.

To further increase the reaction rate and improve product distribution, it is also usually beneficial to include a small amount of copper, preferably in the form of a complex such as cuprammonium acetate, cuprous or cupric oxide, the metal (which is converted to the nitrate) or copper salts such as acetates, sulfates, nitrates, etc. Although any amount sufficient to provide the desired catalytic effect may be used, it is normally preferable to include at least about 0.01% of copper by weight of the nitric acid. Copper concentrations between about 0.01% and about 1% by weight of the nitric acid are generally adequate.

One problem in the conventional nitric acid oxidation of a xylene is that the oxidation reaction mixture tends to separate into aqueous and organic phases, thus reducing the intimacy of contact between the nitric acid and the xylene. The major advantage of the present invention is that inclusion of a nitro-substituted aromatic compound enhances the solubility of nitric acid in the xylene-containing organic phase so that a greater portion of the oxidation reaction takes place in the organic layer. In addition, the higher solubility of the benzene dicarboxylic acid in the aqueous phase promotes the separation of reaction product from the organic phase in which the reaction primarily takes place in the present process.

The nitro-substituted compound used in the present invention can be any aromatic nitro-compound that does not react with nitric acid to substantially eliminate its effectiveness in favorably altering the distributon of xylenes between the aqueous and organic phases of the reaction mixture. The compound is preferably substantially inert to nitric acid, and most desirably an unsubstituted nitro-aromatic compound such as nitrobenzene or a nitronaphthalene. Mixtures of such nitro-aromatic compounds are also useful in the process of this invention, although best results are generally obtained with a single nitro-compound such as nitrobenzene.

Although any proportion of the nitro-substituted compound will generally provide some yield improvement, it is usually advantageous to carry out the reaction in the presence of at least about 25% and preferably at least about 50% of the nitro-compound, based on the weight of the xylene to be oxidized. Thus, for example, when about 50 pounds of nitrobenezne and 50 pounds of paraxylene are mixed with 100 pounds of 50% nitric acid at 75° C., the concentration of nitric acid in the resulting organic phase is over six times as great as in the organic phase of a mixture containing 100 pounds of paraxylene and 100 pounds of 50% nitric acid.

Xylene oxidation in the presence of the nitro-substituted compound can be carried out on a batch or continuous basis at temperatures betwen about 130° and about 300° C. Since the use of lower temperatures is desirable, the present process has the additional advantage of providing high yields of benzene dicarboxylic acids (e.g. up to 70% or higher) at temperatures lower than those normally required for commercially acceptable yields without the nitro-compound present. For highest yields, the mixture should be maintained at a suitable reaction temperature until gas evolution ceases (normally between 30 minutes and 3 hours). To assist in removal of gaseous by-products (mainly nitrogen oxides) the reaction mixture may be sparged with a suitable non-reducing gas such as air. Reaction pressure is desirably sufficient to maintain the xylene and the nitro-substituted compound in liquid phase. For example, a pressure of at least about 40 p.s.i.g. is usually required when the nitro-compound is nitrobenzene, and pressures between about 40 and about 400 p.s.i.g. are generally preferred.

The following examples are included to demonstrate advantages of the process of this invention and do not represent any limitations on the manner in which it can be carried out. Percentages are by weight except where noted otherwise.

Example I 1001 grams of 40% nitric acid which contained 0.3% ammonium metavanadate and 0.5% copper was charged together with 300 ml. of nitrobenzene to a 2.5 liter autoclave equipped with an agitator and heat exchanger coils. The system was purged with nitrogen and then pressured to 100 p.s.i.g. with nitrogen after which the mixture was agitated at 1000 r.p.m. The system was heated to 150° C. and 0.806 mole of p-xylene was fed to the reaction medium over a 25 minute period while maintaining the reaction temperature between 150° and 152.5° C. The pressure of the system was maintained at 100 p.s.i.g. by continually venting the off-gas. After completion of the p-xylene addition period, the reaction mass was held at 151° C. until off-gas production ceased. The total reaction time from the beginning of p-xylene addition to the end of off-gas production was 149 minutes. The reaction product was then drained from the autoclave which was thoroughly rinsed with water and then methanol. The water wash was combined with the reaction product and the resulting mixture was filtered. Nitrobenzene was separated from the filtrate by decantation. The methanol wash was diluted with water and evaporated to dryness under vacuum and the residual solids were added to the product filter cake. The decanted nitrobenzene layer was steam distilled to recover the nitrobenzene. The tails stream from this distillation was evaporated to dryness under vacuum and the resulting solids were analyzed separately from the product filter cake. The product cake was washed, then slurried in 90° C. water, filtered and dried under vacuum. The dry cake weighed 97.4 grams and contained terephthalic acid in a stoichiometric yield of 73%, based on the xylene starting material. The liquid workup streams contained terephthalic acid precursors (predominantly p-toluic acid) in a stoichiometric yield of approximately 23%, based on the xylene starting material.

Example II

The procedure of Example I was repeated with the exception that the reaction temperature and pressure were 165° C. and 150 p.s.i.g. and the time from the beginning of xylene addition to the end of off-gas production was 60 minutes. The stoichiometric yield of terephthalic acid was 74%. Nitrogen oxides were recovered from the off-gas as nitric acid. The liquid work-up streams contained terephthalic acid precursors (predominantly p-toluic acid) in a stoichiometric yield of approximately 22% and the reaction consumed 2.55 moles of nitric acid per mole of reacted p-xylene.

Example III

When the procedure of Example II was repeated with the exception that the p-xylene was fed over a period of 49 minutes, the mixture was sparged for 52 minutes during reaction with two standard liters of air per minute and the total reaction time was 65 minutes, the stoichiometric yield of terephthalic acid was 68.1%, the liquid work-up streams contained terephthalic acid precursors (predominantly p-toluic acid) in a stoichiometric yield of approximately 27% and the reaction consumed 1.05 moles of nitric acid per mole of reacted xylene.

Comparative Example A

When the procedure of Example I was repeated with the exception that the reaction mixture contained no nitro-benzene, the weight of the dry cake was 61.4 grams and the stoichiometric yield of terephthalic acid was 46%.

We claim:

1. A process for preparing a benzene dicarboxylic acid which comprises oxidizing a liquid xylene at a temperature between about 130° and about 300° C. with aqueous nitric acid having a concentration between about 35% and about 70% by weight on an aqueous basis in a reaction mixture having an aqueous phase and an organic phase, said reaction mixture containing nitrobenzene and nitric acid in excess of the amount theoretically needed for oxidation of the xylene in the mixture to the corresponding benzene dicarboxylic acid.

2. The process of claim 1 wherein the reaction mixture contains at least about 25% of the nitrobenzene based on the weight of the xylene in the mixture.

3. The process of claim 1 wherein the reaction mixture contains at least about 50%% of the nitrobenzene based on the weight of the xylene in the mixture.

4. The process of claim 1 wherein the oxidation is carried out under pressure sufficient to maintain the xylene and the nitrobenzene in the mixture in liquid phase.

5. The process of claim 1 wherein the reaction mixture contains a vanadium or copper catalyst.

6. The process of claim 1 wherein the oxidation is carried out on a continuous basis.

7. The process of claim 1 wherein the xylene is para-xylene or meta-xylene.

8. The process of claim 1 wherein the xylene is para-xylene or meta-xylene, the concentration of the nitric acid in the mixture is between about 35% and about 60% by weight on an aqueous basis, the mixture contains at least about 25% of nitrobenzene based on the weight of the xylene in the mixture and the oxidation is carried out under pressure sufficient to maintain the xylene and the nitrobenzene in the mixture in liquid phase.

References Cited

UNITED STATES PATENTS

| | | | |
|---|---|---|---|
| 1,488,730 | 4/1924 | Beall et al. | 260—524 |
| 3,227,752 | 1/1966 | Olivier et al. | 260—524 |
| 3,405,171 | 10/1968 | Roberts | 260—524 |
| 1,332,028 | 2/1920 | Coblentz et al. | 260—524 |

LORRAINE A. WEINBERGER, Primary Examiner

R. S. WEISSBERG, Assistant Examiner